(12) United States Patent
Otsuki

(10) Patent No.: US 9,395,720 B2
(45) Date of Patent: Jul. 19, 2016

(54) NUMERICAL CONTROLLER HAVING A TOOL POSTURE CONTROL FUNCTION FOR MULTI-AXIS MACHINING MACHINES

(71) Applicant: FANUC Corporation, Minamitsuru-gun, Yamanashi (JP)

(72) Inventor: Toshiaki Otsuki, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 470 days.

(21) Appl. No.: 13/865,302

(22) Filed: Apr. 18, 2013

(65) Prior Publication Data
US 2014/0005823 A1    Jan. 2, 2014

(30) Foreign Application Priority Data

Jun. 28, 2012    (JP) ................................. 2012-145942

(51) Int. Cl.
| | |
|---|---|
| G06F 19/00 | (2011.01) |
| G05B 19/25 | (2006.01) |
| G05B 11/01 | (2006.01) |
| G05B 19/4103 | (2006.01) |

(52) U.S. Cl.
CPC .. G05B 19/4103 (2013.01); *G05B 2219/45238* (2013.01); *G05B 2219/50353* (2013.01)

(58) Field of Classification Search
CPC .................................................. G05B 19/4103
USPC ......................................................... 700/189
See application file for complete search history.

(56) References Cited

U.S. PATENT DOCUMENTS

| | | |
|---|---|---|
| 2004/0187654 A1 | 9/2004 | Kato et al. |
| 2009/0140684 A1 | 6/2009 | Otsuki et al. |
| 2009/0228138 A1* | 9/2009 | Otsuki et al. ................... 700/187 |
| 2011/0276173 A1* | 11/2011 | Otsuki et al. ................... 700/173 |

FOREIGN PATENT DOCUMENTS

| | | |
|---|---|---|
| CN | 101526812 | 9/2009 |
| CN | 101881954 | 11/2010 |
| DE | 10360227 A1 | 7/2005 |

(Continued)

OTHER PUBLICATIONS

Office Action issued Nov. 23, 2015 in German Patent Application No. 10 2013 010 404.1 (13 pages) with an English Translation (6 pages).

*Primary Examiner* — Mohammad Ali
*Assistant Examiner* — Md Azad
(74) *Attorney, Agent, or Firm* — Drinker Biddle & Reath LLP

(57) ABSTRACT

A numerical controller controls a multi-axis machining machine having three linear axes and three rotation axes that include one rotation axis for tool phase control. The numerical controller interpolates smoothly a tool center point position and a tool posture (tool direction and tool phase direction) on the basis of a tool center point position instruction and a tool posture instruction; works out an interpolated tool center point position and an interpolated tool posture (interpolated tool direction and interpolated tool phase direction), and, on the basis of the interpolated tool center point position and the interpolated tool posture that have been worked out, calculates each position of the three linear axes and three rotation axes of the multi-axis machining machine, such that the respective axes are driven to the calculated position.

6 Claims, 10 Drawing Sheets

(56) References Cited

FOREIGN PATENT DOCUMENTS

| | | |
|---|---|---|
| DE | 102011015296 A1 | 11/2011 |
| JP | 5-324047 A | 12/1993 |
| JP | 2005-182437 A | 7/2005 |
| JP | 2007-322392 A | 12/2007 |
| JP | 2009-301232 A | 12/2009 |
| JP | 2012-032848 | 2/2012 |

* cited by examiner

```
N001  G43.4  G01  Xx1  Yy1  Zz1  Ii1  Jj1  Kk1  Uu1
Vv1  Ww1  Ff  Hh  ;
N002  Xx2  Yy2  Zz2  Ii2  Jj2  Kk2  Uu2  Vv2  Ww2  ;
.......
.......
G49  ;
```

```
N001  G43.4  G01  Xx1  Yy1  Zz1  Aa1  Bb1  Cc1  Ff
Hh  ;
N002  Xx2  Yy2  Zz2  Aa2  Bb2  Cc2  ;
.......
.......
G49  ;
```

```
N001  G43.4  G01  Xx1  Yy1  Zz1  Ii1  Jj1  Kk1  Wθ1
Ff  Hh  ;
N002  Xx2  Yy2  Zz2  Ii2  Jj2  Kk2  Wθ2  ;
.......
.......
G49  ;
```

```
N001  G43.4  G01  Xx1  Yy1  Zz1  Rr1  Uu1  Vv1  Ww1
Ff  Hh  ;
N002  Xx2  Yy2  Zz2  Rr2  Uu2  Vv2  Ww2  ;
.......
.......
G49  ;
```

NUMERICAL CONTROLLER HAVING A TOOL POSTURE CONTROL FUNCTION FOR MULTI-AXIS MACHINING MACHINES

RELATED APPLICATION DATA

This application claims priority under 35 U.S.C. §119 and/or §365 to Japanese Application No. 2012-145942 filed Jun. 28, 2012, the entire contents of which is incorporated herein by reference.

BACKGROUND OF THE INVENTION

1. Field of the Invention

The present invention relates to a numerical controller having a tool posture control function for multi-axis machining machines, for controlling a multi-axis machining machine that has at least three linear axes and at least three rotation axes including one rotation axis for tool phase control.

2. Description of the Related Art

In a multi-axis machining machine that has at least three linear axes and at least three rotation axes including one rotation axis for tool phase control, a workpiece may be machined, as described in [1] to [3] below, while a tool center point position, a tool direction and a tool phase direction are caused to vary.

[1] Fiber Placement Machine

A fiber placement machine is a processing machine in which a fiber (carbon fiber reinforced plastic material) paid out of a roller is wound around a workpiece that has a smooth surface, for instance aircraft fuselage, wings and rocket bodies. A tool position (arm position) is controlled by an arm that operates in the X, Y, Z-axes. The tool direction is controlled in two rotation axes, i.e. B-axis and C-axis. The tool phase direction (roller direction) is controlled in a further rotation axis, i.e. A-axis.

In FIG. 1, the main body of the fiber placement machine is present on the right side, but is not depicted in the picture. The workpiece is drawn relatively small with respect to the tool. As illustrated in FIG. 2, the fiber is wound while the tool center point position moves smoothly over the workpiece and while the tool direction and the tool phase direction are caused to vary smoothly. In FIG. 2, the pathway where the tool center point position changes is drawn as tool center point pathway and the pathways where the vector tips that denote the tool direction and the tool phase direction change are respectively drawn as the tool direction pathway and the tool phase direction pathway. The vector that denotes the tool direction and the tool phase direction is set to a unit vector. The same applies hereafter.

[2] Water Jet Machine

Herein, a water jet machine is a processing machine that cuts a workpiece through jetting of high-pressure cutting water out of a nozzle, as illustrated in FIG. 3. A catcher that receives cutting water is supported by an arm. The tool position (tool head position) is controlled in three linear axes, namely the X-axis, Y-axis and Z-axis, the tool direction (nozzle direction) is controlled in two rotation axes, namely the B-axis and C-axis, and the tool phase direction (arm direction) is controlled in one further rotation axis, namely the A-axis.

As illustrated in FIG. 4, the workpiece is cut while the tool center point position moves smoothly over the workpiece and while the tool direction (nozzle direction) and the tool phase direction (arm direction) are caused to vary smoothly.

[3] Hale Machining

Hale machining is a kind of machining where a haling tool (non-rotational tool) is used and wherein the tool posture is controlled in such a manner that the tool direction is substantially perpendicular to the machined surface of the workpiece, and the rake face of the tool is substantially perpendicular to the tool center point pathway, as illustrated in FIG. 5. The tool position (tool head position) is controlled in three linear axes, namely the X-axis, Y-axis and Z-axis, the tool direction is controlled in two rotation axes, namely the B-axis and C-axis, and the tool phase direction is controlled in one further rotation axis, namely the A-axis.

As illustrated in FIG. 6, the workpiece is machined while the tool center point position moves smoothly over the workpiece and while causing the tool direction and the tool phase direction to vary smoothly.

In the explanation of the above-described multi-axis machining machines, the tool direction is controlled in the B-axis and C-axis, and the tool phase direction is controlled in the A-axis, but other examples are possible wherein the tool direction is controlled in the A-axis and B-axis, and the tool phase direction is controlled in the C-axis; or, alternatively, the tool direction is controlled in the A-axis and C-axis, and the tool phase direction is controlled in the B-axis. The examples of the above multi-axis machining machines involve a multi-axis machining machine of tool head rotation type, wherein the rotation axes in which the tool direction and the tool phase direction are controlled are on the tool side, but may involve a multi-axis machining machine of table rotation type in which a rotation axis or rotation axes are on a table side and a table and a tool are caused to rotate relatively to each other (see FIG. 21 in which tool direction is controlled in the B-axis and C-axis, while tool phase direction is controlled in the A-axis), or a mixed-type multi-axis machining machine in which a rotation axis or rotation axes are both on the tool side and the table side and the table and the tool are caused to rotate relatively to each other (see FIG. 22 in which tool direction is controlled in the A-axis and C-axis, while tool phase direction is controlled in the B-axis).

Japanese Patent Application Laid-Open No. 2009-301232 discloses a numerical controller for tool phase control where coordinate transformation (inclined-plane machining instruction) can be performed for a tool center point control instruction, including control of the roller direction (tool phase direction) in a third rotation axis. However, the numerical controller for tool phase control controls only the tool phase direction, and does not involve the technical idea of interpolating smoothly the tool center point position and tool posture (tool direction and tool phase direction).

Japanese Patent Application Laid-Open No. 2005-182437 discloses a numerical controller in which interpolation is performed using a smooth curve that approximates an expected curve, even in four- or five-axis processing machines such as those where a workpiece is machined with a tilted tool. In this numerical controller, a correction vector end point that corresponds to an instruction vector is worked out by displacing the vector endpoint of the instruction vector towards a position that is closest to an approximation curve for the vector end point, within a set tolerance range, in order to smoothly vary the working point and the relative relationship between the tool and the workpiece. Specifically, this patent document discloses the feature of correcting an instruction vector that denotes a tool direction, to yield a smooth curve, but does not disclose the technical idea of smoothly interpolating a tool center point position and a tool posture (tool direction and tool phase direction) including a tool phase direction. Accordingly, the above technology cannot be used in a machine tool that requires control of the tool phase direction.

Japanese Patent Application Laid-Open No. 2007-322392 discloses a posture smoothing method that allows obtaining a time series of posture information in which offset is removed from a time series of posture information which includes offset of an object, on an image captured by imaging means. This posture smoothing method is a technology relating to image processing, but not a technology for controlling machine tools. That is, the above patent document does not disclose the technical idea of interpolating smoothly the tool center point position and tool posture (tool direction and tool phase direction), or the technical idea of controlling three linear axes and three rotation axes on the basis of the tool center point position and tool posture.

Japanese Patent Application Laid-Open No. H5-324047 discloses a tangential direction control scheme of tool axes that enables control in such a manner that the tool faces constantly a tangential direction with respect to the travel direction. Herein, performing control in such a manner that a tool faces constantly a tangential direction with respect to the travel direction is found to be equivalent to controlling the tool phase. However, the above patent document does not disclose the technical idea of interpolating smoothly the tool center point position and tool posture (tool direction and tool phase direction).

SUMMARY OF THE INVENTION

The present invention relates to a numerical controller in which a tool center point position and a tool posture (tool direction and tool phase direction) are interpolated smoothly, and three linear axes and three rotation axes are controlled. An object of the present invention is to provide a numerical controller having a tool posture control function for multi-axis machining machines that enables machining while varying smoothly a tool with a smooth tool center point pathway, a smooth tool direction pathway (pathway of the tip of a tool direction vector) and a smooth tool phase direction pathway (pathway of the tip of a tool phase direction vector), in machining that involves varying the tool center point position, the tool direction (tool direction vector) and the tool phase direction (tool phase direction vector). The tool direction and the tool phase direction are perpendicular to each other.

If the tool direction pathway and the tool phase direction pathway are depicted in the form of changes of the tool direction (tool direction vector) and the tool phase direction (tool phase direction vector) alone, excluding a tool center point pathway fraction from the tool direction pathway and the tool phase direction pathway illustrated in FIG. 7, then the pathways can be represented as pathways on a unit sphere having a radius of 1, as in FIG. 8. For convenience, fewer vectors are depicted in FIG. 8 than in FIG. 7.

The numerical controller according to the present invention has a tool posture control function for multi-axis machining machine and controls a multi-axis machining machine that has at least three linear axes and at least three rotation axes including one rotation axis for tool phase control. The numerical controller includes: a tool position and posture instruction reading unit that reads a machining program that includes a tool center point position instruction and a tool posture instruction for a tool posture formed on the basis of a tool direction and a tool phase direction; a tool position and posture interpolation unit that interpolates smoothly a tool center point position and a tool posture on the basis of the tool center point position instruction and the tool posture instruction, and works out an interpolated tool center point position and an interpolated tool posture formed on the basis of an interpolated tool direction and an interpolated tool phase direction; and a respective axis positions arithmetic unit that calculates respective axis positions of the at least three linear axes and the at least three rotation axes, on the basis of the interpolated tool center point position and the interpolated tool posture, wherein the at least three linear axes and the at least three rotation axes are driven to the respective axis positions.

The tool posture instruction may have a tool direction vector instruction, as an instruction of the tool direction, and a tool phase direction vector instruction, or a tool phase deviation angle instruction that instructs an angle of deviation of the tool phase direction from a tool center point travel direction, as an instruction of the tool phase direction.

The tool posture instruction may have an instruction of two rotation axes from among the at least three rotation axes, as an instruction of the tool direction, and an instruction of one rotation axis from among the at least three rotation axes, or an instruction of a tool phase deviation angle instruction that instructs an angle of deviation of the tool phase direction from a tool center point travel direction, as an instruction of tool phase direction.

The tool posture instruction may be a quaternion instruction by a quaternion that instructs the tool direction and the tool phase direction rotated from an initial tool direction and an initial tool phase direction. In this case, the tool position and posture interpolation unit can be configured so as to interpolate smoothly the tool center point position and work out the interpolated tool center point position, and to interpolate smoothly a quaternion on the basis of the quaternion instruction, work out an interpolated quaternion, and use the interpolated quaternion as the interpolated tool posture.

The tool position and posture interpolation unit can be configured so as to interpolate smoothly the tool center point position, the tool direction and the tool phase direction, to work out thereby the interpolated tool center point position and the interpolated tool posture.

The tool position and posture interpolation unit can be configured so as to interpolate smoothly the tool center point position and the tool direction and work out the interpolated tool center point position and the interpolated tool direction, and to work out the interpolated tool phase direction that is perpendicular to the interpolated tool direction and that forms the deviation angle with respect to a plane formed by a change direction of the interpolated tool center point position and the interpolated tool direction.

The tool position and posture interpolation unit can be configured so as to interpolate smoothly the tool center point position and work out the interpolated tool center point position, and to work out a corresponding quaternion instruction from the tool posture instruction and, on the basis of the corresponding quaternion instruction, interpolate smoothly a quaternion, workout an interpolated quaternion, and use the interpolated quaternion as the interpolated tool posture.

Thus, the present invention succeeds in providing a numerical controller having a tool posture control function for multi-axis machining machines that enables machining while varying smoothly a tool with a smooth tool center point pathway, a smooth tool direction pathway (pathway of the tip of a tool direction vector) and a smooth tool phase direction pathway (pathway of the tip of a tool phase direction vector), in machining that involves varying the tool center point position, the tool direction (tool direction vector) and the tool phase direction (tool phase direction vector).

BRIEF DESCRIPTION OF THE DRAWINGS

The abovementioned object and features of the present invention, and other objects and features, will become apparent from the explanation of the examples below with reference to accompanying drawings, wherein.

DESCRIPTION OF THE PREFERRED EMBODIMENTS

The present invention can be used in a variety of multi-axis machining machines. Embodiments of the present invention are explained in detail below.

First Embodiment

Figure 1:
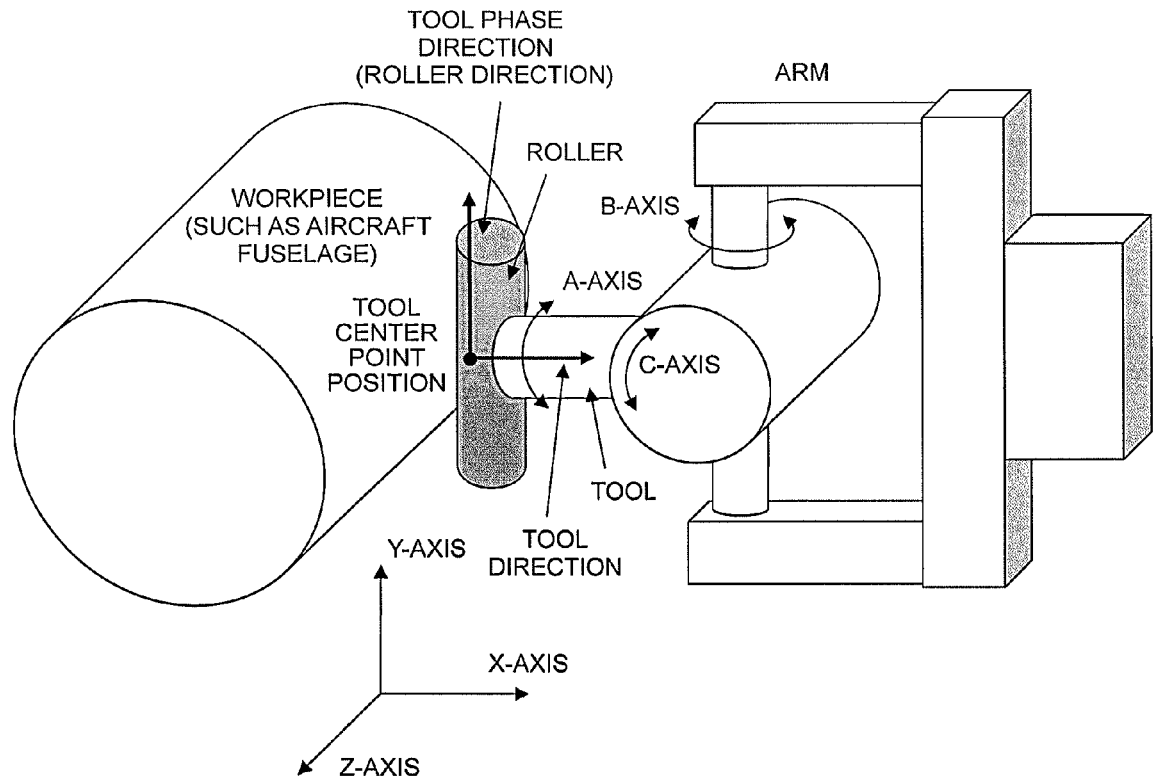
FIG. 1 is a diagram for explaining a fiber placement machine as a multi-axis machining machine.
Figure 2:
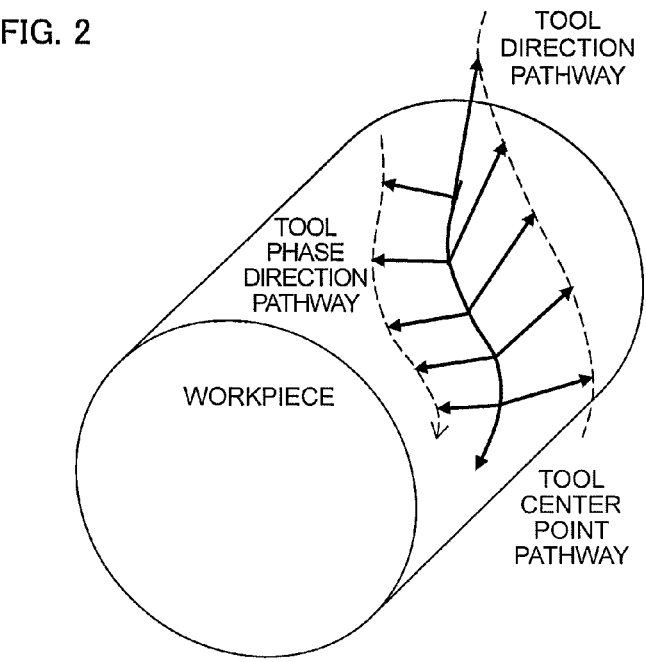
FIG. 2 is a diagram for explaining a tool center point pathway, a tool direction pathway and a tool phase direction pathway.
Figure 3:
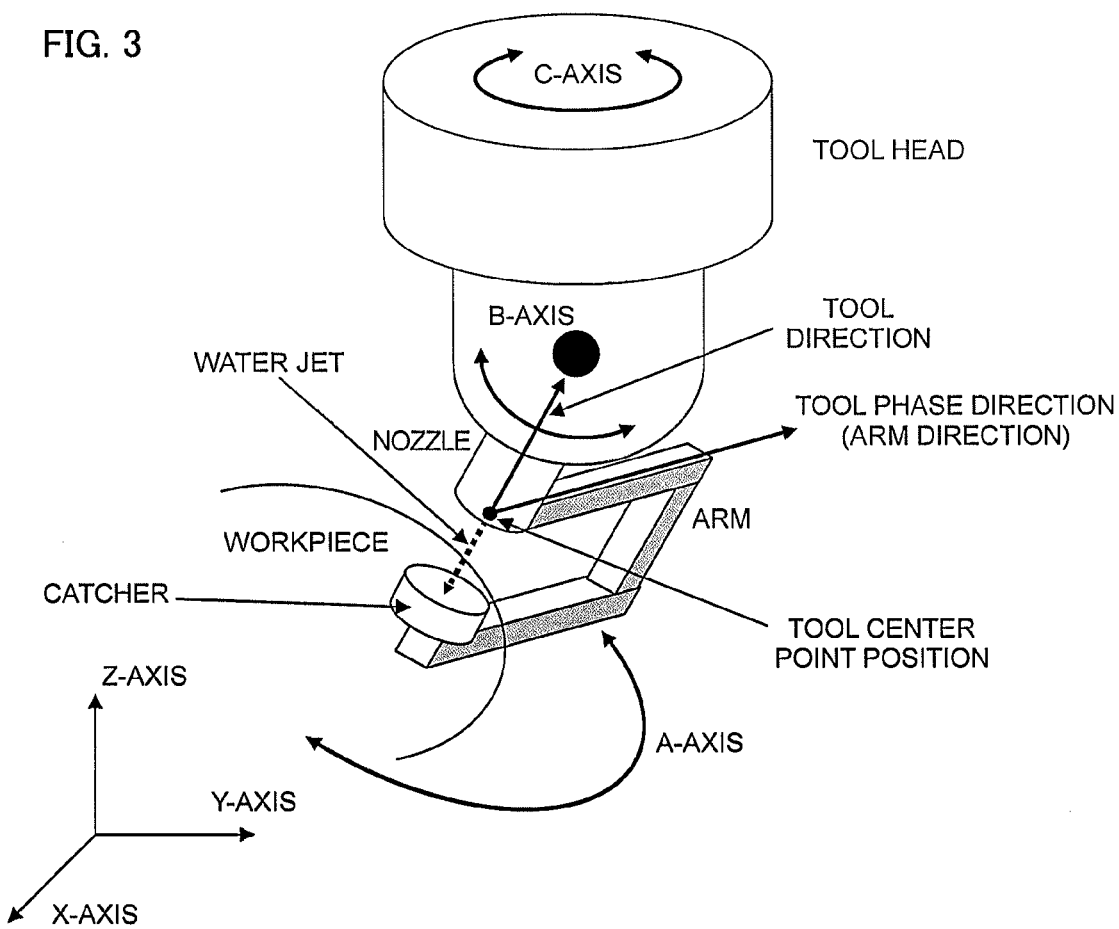
FIG. 3 is a diagram for explaining a water jet machine as a multi-axis machining machine.
Figure 4:
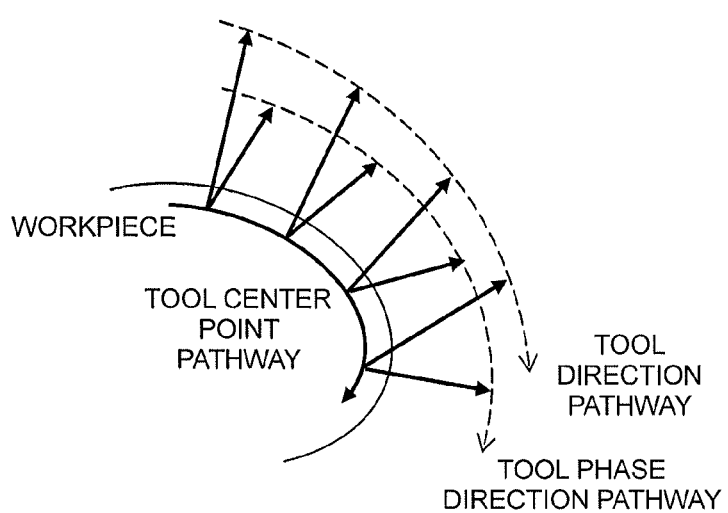
FIG. 4 is a diagram for explaining cutting of a workpiece in the water jet machine in FIG. 3 while a tool center point position moves smoothly over a workpiece, and while varying smoothly a tool direction (nozzle direction) and a tool phase direction (arm direction)
Figure 5:
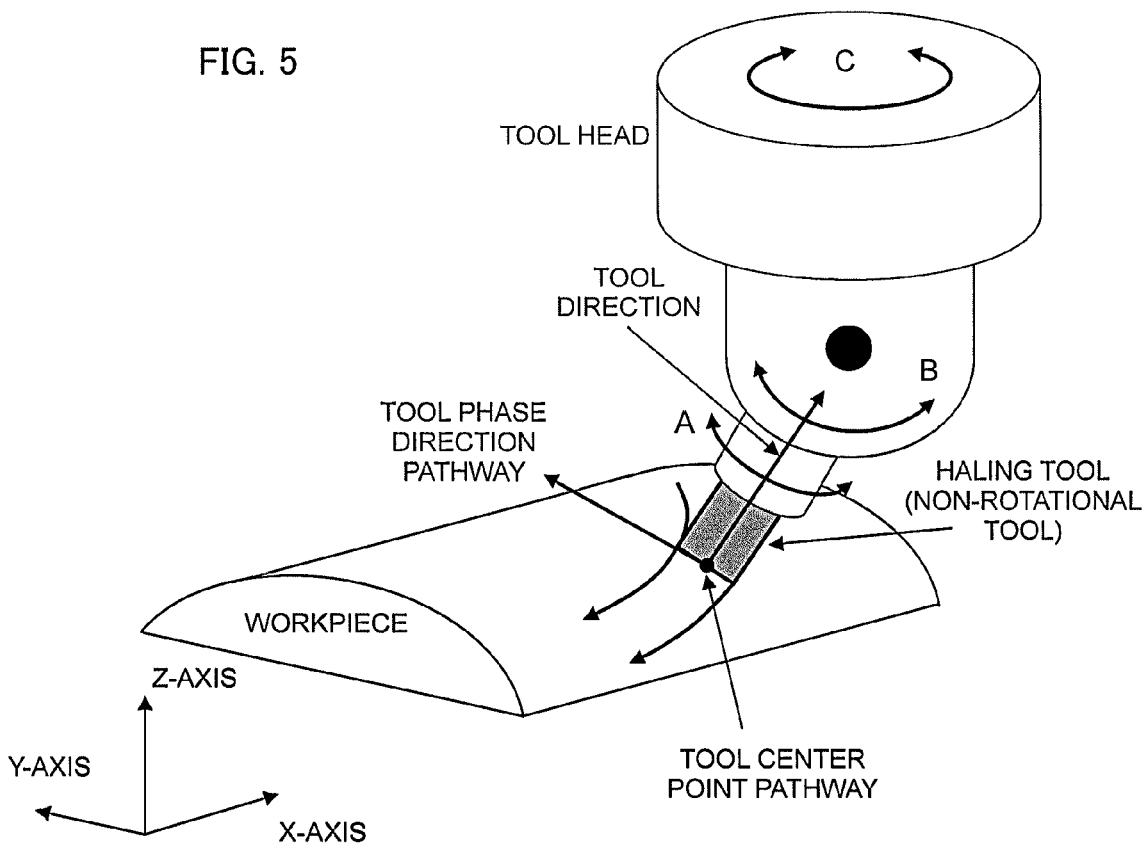
FIG. 5 is a diagram for explaining hale machining using a multi-axis machining machine.
Figure 6:
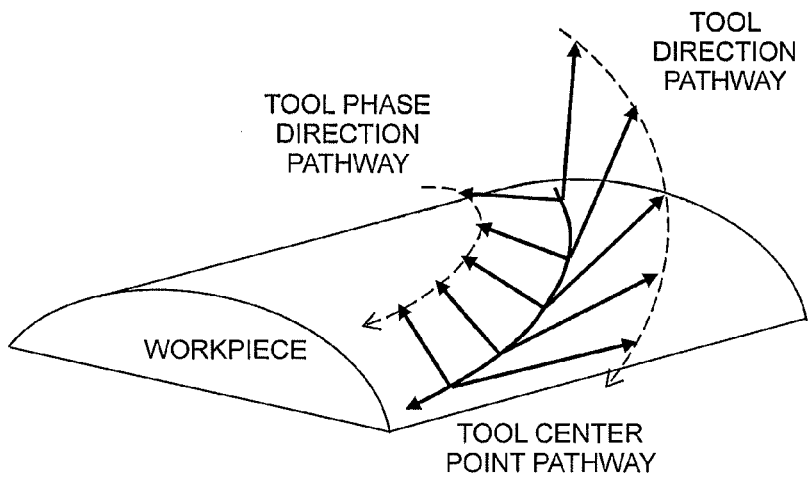
FIG. 6 is a diagram for explaining machining of a workpiece in hale machining illustrated in FIG. 5, using a haling tool, while a tool center point position moves smoothly over a workpiece and while varying smoothly the tool direction and the tool phase direction.

In the machine configuration illustrated in FIG. 1, FIG. 3 and FIG. 5, a tool head is controlled in three linear axes, i.e. the X-axis, Y-axis and Z-axis, the tool direction is controlled in two rotation axes, i.e. the B-axis and C-axis, and the tool phase direction is controlled in one further rotation axis, i.e. the A-axis. In the machining program, as illustrated in machining program example 1 depicted in FIG. 9, the tool center point position is instructed with a tool center point position instruction (xn, yn, zn) according to an address X, Y, Z, the tool direction is instructed with a tool direction vector instruction (in, jn, kn) according to an address I, J, K, and the tool phase direction is instructed with a tool phase direction vector instruction (un, vn, wn) (n=1, 2, . . . ) according to an address U, V, W. The tool direction vector instruction and the tool phase direction vector instruction are tool posture instructions.

Herein, "G43.4" is a G code of start of a tool center point control mode that instructs a tool center point position, and "G49" is a G code of termination of that tool center point control mode. Further, instruction speed is instructed by "F", and a tool length compensation number is instructed by "H". Herein, (in, jn, kn), (un, vn, wn) are set to unit vectors. A tool position and posture instruction reading unit (FIG. 16) reads the tool center point position instruction (xn, yn, zn), the tool direction vector instruction (in, jn, kn) and the tool phase direction vector instruction (un, vn, wn).

In the present example, the tool phase direction is instructed with the tool phase direction vector instruction (un, vn, wn) according to the address U, V, W, but the tool phase direction instruction may be a tool phase deviation angle instruction that instructs a deviation angle of the tool phase direction from a tool center point travel direction, as in the below-described third embodiment.

Figures 9, 10, 11:
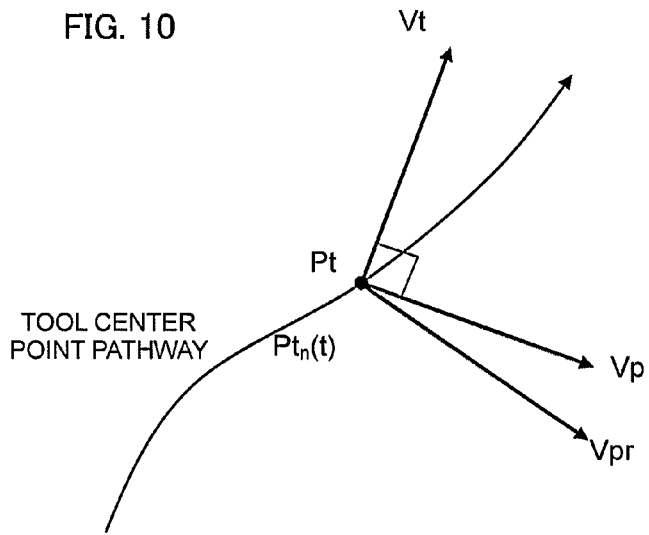
FIG. 9 is a machining program example in which a tool posture instruction is instructed with a tool direction vector and a tool phase direction vector.
FIG. 10 is a diagram for explaining an interpolated tool phase direction vector Vp being worked out in a first embodiment.
FIG. 11 is a machining program example in which a tool posture instruction is instructed according to a rotation axis position instruction for two rotation axes and one rotation axis.

The tool center point position is "smoothly interpolated", on the basis of an instruction point sequence (x1, y1, z1), (x2, y2, z2) . . . of the address X, Y, Z, to yield an interpolated tool center point position $Pt(Ptx, Pty, Ptz)^T$ that denotes a tool center point pathway. Herein, the feature "smoothly interpolated" involves generating, on the basis of the instruction point sequence (x1, y1, z1), (x2, y2, z2) . . . , a smooth curve such as a spline curve, NURBS curve or the like that passes through the instruction points, and interpolating a position on the smooth curve in accordance with the instruction speed, at each interpolation period. That is, interpolation involves working out a parameter value s at an interpolation time τ in accordance with the instruction speed and working out $Pt=Pt_n(s)$, wherein $Pt_n(t)$ ($0 \le t \le 1$) according to a parameter t is used as a function that represents a smooth curve that passes through the instruction point sequence from an n-th block to an (n+1)th block (FIG. 10).

The smooth curve may be a curve that passes through the vicinity thereof within an allowable value range, without passing through the instruction point sequence. The technique of smoothly interpolating in this manner positions of instruction points on the basis of an instruction point sequence is a conventional one, for instance as disclosed in Japanese Patent Application Laid-Open No. 2005-182437, and will not be explained in detail. Herein, "$^T$" denotes transposition, but will not be notated hereafter when obvious.

Figure 8:
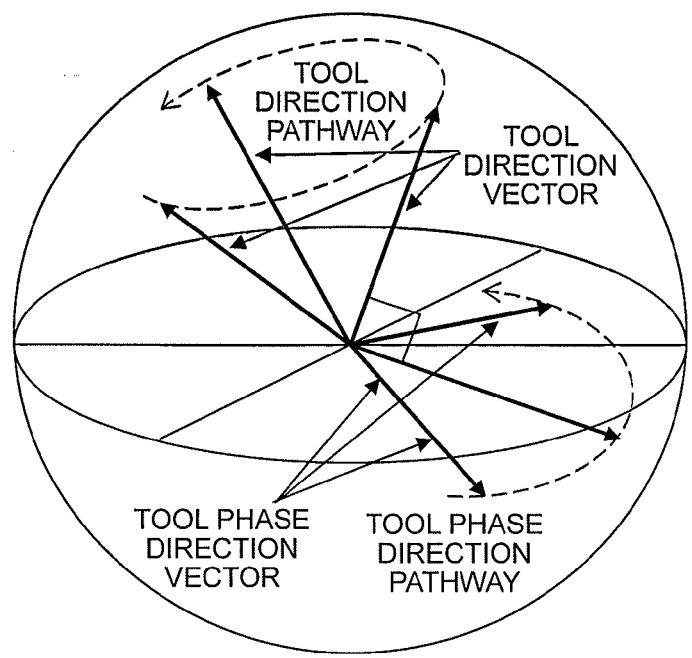
FIG. 8 is a diagram for explaining a tool direction pathway and a tool phase direction pathway as changes of a tool direction (tool direction vector) and a tool phase direction (tool phase direction vector) alone, excluding a tool center point pathway fraction.

Similarly, the tool posture is "smoothly interpolated" on the basis of a tool direction vector instruction sequence (i1, j1, k1), (i2, j2, k2) . . . of address I, J, K, to yield Vtr(Vtrx, Vtry, Vtrz). Herein, "smoothly interpolated" involves generating a smooth curve such as a spline curve, NURBS curve or the like that passes through the tips of the tool direction vector instruction sequence (i1, j1, k1), (i2, j2, k2) . . . , as illustrated in FIG. 8, and interpolating positions on the smooth curve in accordance with the interpolated tool center point position Pt. That is, interpolation involves working out $Vtr=Vtr_n(s)$, wherein a vector $Vtr_n(t)$ ($0 \le t \le 1$) according to a parameter t is used as a function that represents a smooth curve that passes through the tips of the tool direction vector instruction sequence from an n-th block to an (n+1)th block. The smooth curve may be a curve that passes through the vicinity thereof within an allowable value range, without passing through the tips of the tool direction vector instruction sequence. As in the case of Pt, the technique of smoothly interpolating the tool posture on the basis of a vector instruction sequence such as the below-described Vp is a well-known one, for instance as disclosed in Japanese Patent Application Laid-Open No. 2005-182437. An interpolated tool direction vector Vt(Vtx, Vty, Vtz) that denotes the tool direction pathway (FIG. 8) is obtained by normalizing Vtr as in Expression (1).

$$Vt = \frac{Vtr}{|Vtr|} \quad (1)$$

Figure 16:
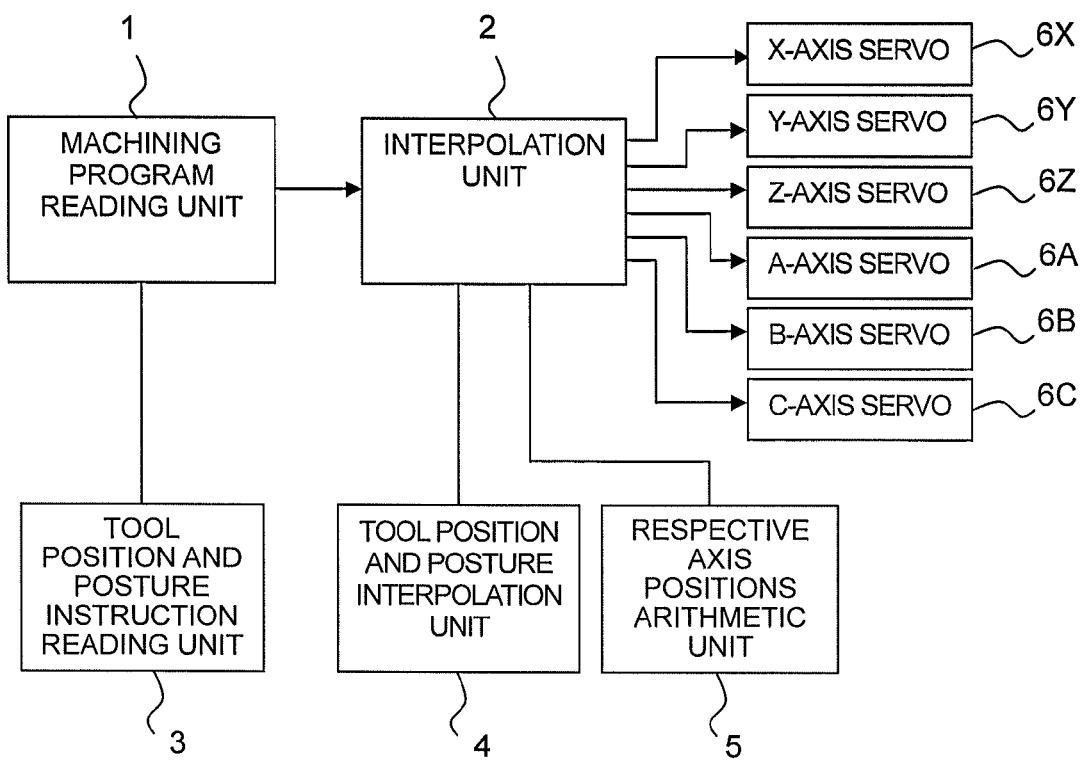
FIG. 16 is a block diagram for explaining a numerical controller according to the present invention.

Herein Vpr(Vprx, Vpry, Vprz) is obtained, similarly to Vtr, by smoothly interpolating the tool posture on the basis of the tool phase direction vector instruction sequence (u1, v1, w1), (u2, v2, w2) . . . of the address U, V, W. The calculation in Expression (2) is performed to obtain the interpolated tool phase direction vector Vp. Herein, "x" denotes outer product. A normalized vector Vp(Vpx, Vpy, Vpz) (FIG. 10) perpendicular to the plane formed by Vt and Vpr is obtained as a result. The vector Vp denotes a tool phase direction pathway (FIG. 8). Herein, Vt and Vp give the interpolated tool posture. These interpolations are performed by a tool position and posture interpolation unit (FIG. 16).

$$Vp = \frac{(Vt \times Vpr) \times Vt}{|(Vt \times Vpr) \times Vt|} \quad (2)$$

The positions B and C in the B-axis and C-axis in which the interpolated tool direction vector Vt is realized are worked out by solving Expression (3) below. Herein, Rb and Rc are rotation matrices at a time where the B-axis and C-axis are at positions B and C. Further, Vt0 is a unit vector that denotes an initial tool direction at a time where B=C=0.

$$Vt = Rc * Rb * Vt0 \quad (3)$$

$$Rc = \begin{bmatrix} \cos C & -\sin C & 0 \\ \sin C & \cos C & 0 \\ 0 & 0 & 1 \end{bmatrix}$$

$$Rb = \begin{bmatrix} \cos B & 0 & \sin B \\ 0 & 1 & 0 \\ -\sin B & 0 & \cos B \end{bmatrix}$$

Expression (3) yields Expression (4) when Vt0=(1, 0, 0).

$$Vt = \begin{bmatrix} \cos C * \cos B \\ \sin C * \cos B \\ -\sin B \end{bmatrix} \quad (4)$$

The A-axis position A at which the interpolated tool phase direction vector Vp is realized is worked out by solving Expression (5) below. Since B and C are already obtained, A can be worked out based on Expression (5). Herein, Ra is the rotation matrix at a time where the A-axis is at position A. Further, Vp0 is a unit vector that denotes the initial tool phase direction at a time where A=B=C=0.

$$Vp = Rc * Rb * Ra * Vp0 \quad (5)$$

$$Ra = \begin{bmatrix} 1 & 0 & 0 \\ 0 & \cos A & -\sin A \\ 0 & \sin A & \cos A \end{bmatrix}$$

Expression (5) yields Expression (6) when Vp0=(0, 1, 0).

$$Vp = \begin{bmatrix} \cos C * \sin B * \sin A - \sin C * \cos A \\ \sin C * \sin B * \sin A + \cos C * \cos A \\ \cos B * \sin A \end{bmatrix} \quad (6)$$

A control point position Pc(Pcx, Pcy, Pcz) to which the X-axis, Y-axis and Z-axis are driven is the intersection of the rotation center line of the B-axis and the rotation center line of the C-axis. Herein, Pc is worked out based on Expression (7). Further, Th is a tool length compensation amount (scalar quantity) that is selected according to a tool length compensation number.

The positions Pc(Pcx, Pcy, Pcz), A, B, C for the respective axes are worked out in respective axis positions arithmetic unit 5 (FIG. 16)

$$Pc=Pt+Th*Vt \quad (7)$$

Figure 7:
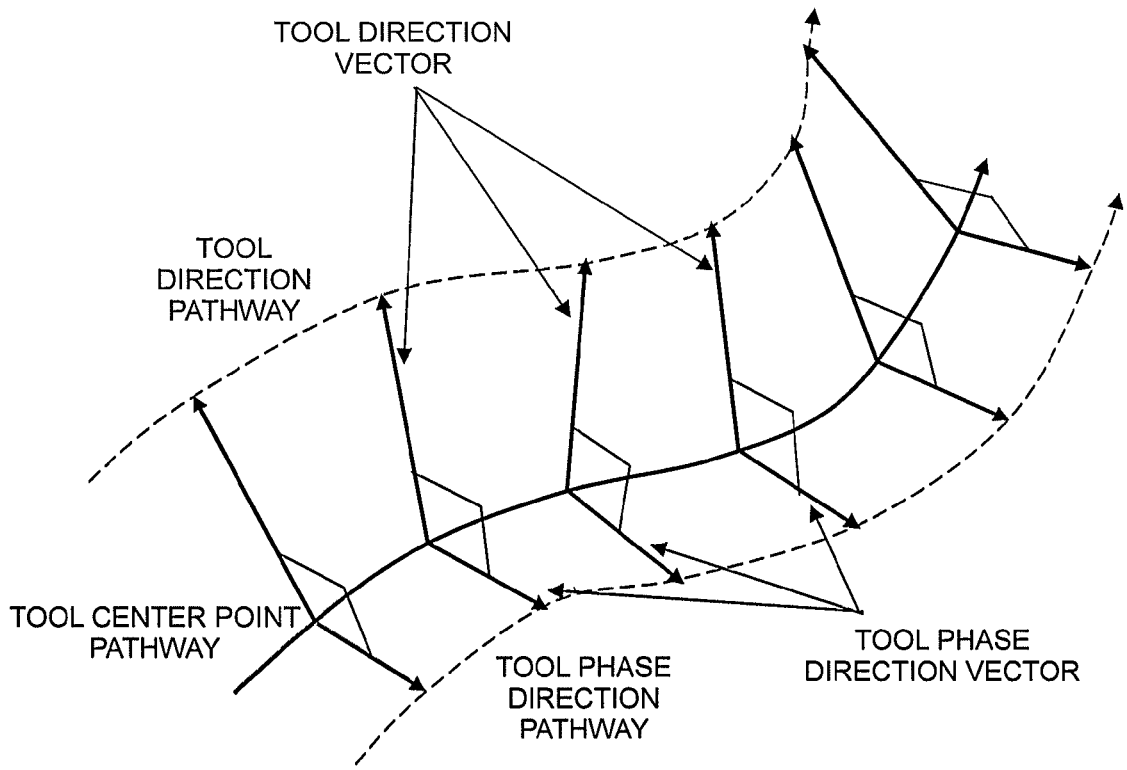
FIG. 7 is a diagram for explaining the problem of the present invention, namely machining a workpiece while smoothly varying a tool center point pathway, a tool direction pathway (pathway of the tip of a tool direction vector), and a tool phase direction pathway (pathway of the tip of a tool phase direction vector)

Thus, control can be performed in such a manner that the tool center point pathway, the tool direction pathway and the tool phase direction pathway are smooth curves, as illustrated in FIG. 7 and FIG. 8, by driving the X-axis, the Y-axis and the Z-axis to the Pc position, driving the B-axis and C-axis to the B and C positions, and driving the A-axis to the A position.

Second Embodiment

In the first embodiment described above, the tool posture instruction was instructed with a tool direction vector and a tool phase direction vector, as in machining program example 1 (FIG. 9); however, there may be instructed, as the instruction of the tool direction, a rotation axes positions instruction (bn, cn) (n=1, 2, . . . ) for two rotation axes, i.e. the B-axis and C-axis in which the tool direction is controlled, from among the three rotation axes, and, as a tool phase direction instruction, there may be instructed a rotation axis position instruction (an) for one rotation axis, i.e. the A-axis, in which the tool phase direction is controlled, as in machining program example 2 illustrated in FIG. 11. In this embodiment, thus, the rotation axis position instructions for these two rotation axes and one rotation axis constitute the tool posture instruction. Other instructions are identical to those in machining program example 1.

Herein, a tool phase direction instruction has been exemplified in the form of the rotation axis position instruction (an) for the A-axis, which is one rotation axis in which the tool phase direction is controlled, but the tool phase direction instruction may be in the form of a tool phase deviation angle instruction that instructs a deviation angle of the tool phase direction from a tool center point travel direction, as in the third embodiment described below.

In a case where the rotation axes positions instruction (bn, cn) for the two rotation axes, i.e. the B-axis and C-axis in which the tool direction is controlled, from among the three rotation axes, is instructed as the tool direction instruction, and the rotation axis position instruction (an) for a further rotation axis, i.e. the A-axis, in which the tool phase direction is controlled, is instructed as the tool phase direction instruction, then it suffices to replace these position instructions an, bn, cn of the three rotation axes by in, jn, kn, as in Expression (8) below, and by un, vn, wn, as in Expression (9) below (n=1, 2, . . . ), and by performing then calculations identical to those of machining program example 1 in the first embodiment. Features ensuing after that point will not be explained again.

$$\begin{bmatrix} in \\ jn \\ kn \end{bmatrix} = Rcn * Rbn * Vt0 \tag{8}$$

$$Rcn = \begin{bmatrix} \cos(cn) & -\sin(cn) & 0 \\ \sin(cn) & \cos(cn) & 0 \\ 0 & 0 & 1 \end{bmatrix}$$

$$Rbn = \begin{bmatrix} \cos(bn) & 0 & \sin(bn) \\ 0 & 1 & 0 \\ -\sin(bn) & 0 & \cos(bn) \end{bmatrix}$$

$$\begin{bmatrix} un \\ vn \\ wn \end{bmatrix} = Rcn * Rbn * Ran * Vp0 \tag{9}$$

$$Ran = \begin{bmatrix} 1 & 0 & 0 \\ 0 & \cos(an) & -\sin(an) \\ 0 & \sin(an) & \cos(an) \end{bmatrix}$$

Third Embodiment

Figures 12, 13, 14:
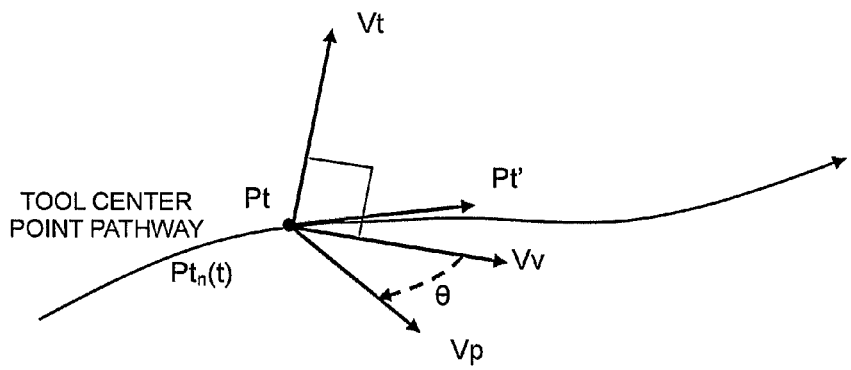
FIG. 12 is a machining program example in which a tool posture instruction is instructed with a tool direction vector instruction and a tool phase deviation angle instruction.
FIG. 13 is a diagram for explaining an interpolated tool phase direction vector Vp being worked out in a third embodiment.
FIG. 14 is a machining program example in which a tool posture instruction is instructed according to a quaternion instruction.

In the above-described first embodiment, the tool phase direction instruction was in the form of an instruction according to a tool phase direction vector, as in machining program example 1, but, in the third embodiment, may be in the form of a tool phase deviation angle instruction, according to an address W, which instructs a deviation angle ($\theta n$) (n=1, 2, . . . ) of the tool phase direction from the tool center point travel direction, as in machining program example 3 illustrated in FIG. 12. The tool direction vector instruction (in, jn, kn) (identical to that in the first embodiment) and the tool phase deviation angle instruction constitute herein a tool posture instruction. Other instructions are identical to those in machining program example 1. The deviation angle ($\theta n$) of the tool phase direction from the tool center point travel direction is ordinarily not instructed for each block, and there is only an instruction ($\theta 1$) of a first block. Therefore, the explanation below will deal only with $\theta(=\theta 1)$, with no suffixed n. Needless to say, an instruction may be issued for each block, and $\theta$ may be modified for each block. In that case, $\theta$ in the explanation below becomes $\theta n$. Herein, $\theta$ is often a fixed value such as 0 degrees, ±90 degrees, ±180 degrees or ±270 degrees, and hence a preset value may be used as a given angle (constant). In this case there is instructed no W$\theta n$ (for instance, W$\theta 1$, W$\theta 2$ in FIG. 12). An instance where no W$\theta n$ is instructed corresponds to a type of instruction wherein a preset value is used; i.e. if no W$\theta n$ is instructed, then a preset given angle (constant) is used as the deviation angle ($\theta$).

The interpolated tool center point position Pt and the interpolated tool direction vector Vt(Vtx, Vty, Vtz) are identical to those of in the first embodiment. The derivative of the function $Pt_n(t)$ of the first embodiment is set herein to $Pt_n(t)'$ thereof. Herein, $Pt_n(t)'$ as well is a function that yields a smooth curve, and Pt' is set to $Pt_n(s)'$, i.e. Pt'=$Pt_n(s)'$, where "s" is the "s" explained in the first embodiment. Further, Vp at an interpolation time τ is worked out on the basis of Expression (10) below. Herein, Vv is a unit vector perpendicular to Vt in the plane formed by Pt' and Vt, and R$\theta$ is a rotation matrix for rotation about Vt by an angle $\theta$. In Expression (10), Vp is worked out as a vector resulting from rotating Vv about Vt by an angle $\theta$ (FIG. 13). In this way there is worked out the interpolated tool phase direction vector Vp that is perpendicular to the interpolated tool direction vector Vt and that forms a deviation angle $\theta$ with respect to the plane formed by the interpolated tool direction vector Vt and a change direction Pt' of the interpolated tool center point position.

$$Vp = R\theta * Vv \tag{10}$$

Expression (11) below gives Vv and R$\theta$.

$$Vv = \frac{Vt \times (Pt' \times Vt)}{|Vt \times (Pt' \times Vt)|} \tag{11}$$

$$R\theta = \begin{bmatrix} Vtx^2 + (1 - Vtx^2) * \cos\theta & Vtx * Vty * (1 - \cos\theta) - Vtz * \sin\theta & Vtx * Vtz * (1 - \cos\theta) + Vty * \sin\theta \\ Vtx * Vty * (1 - \cos\theta) + Vtz * \sin\theta & Vty^2 + (1 - Vty^2) * \cos\theta & Vty * Vtz * (1 - \cos\theta) - Vtx * \sin\theta \\ Vtx * Vtz * (1 - \cos\theta) - Vty * \sin\theta & Vty * Vtz * (1 - \cos\theta) + Vtx * \sin\theta & Vtz^2 + (1 - Vtz^2) * \cos\theta \end{bmatrix}$$

The calculation involved after obtaining Vp is identical to that of the first embodiment, and an explanation thereof will be omitted.

Fourth Embodiment

As a tool posture instruction (tool direction instruction, tool phase direction instruction) in the machining program example 1 (FIG. 9) of the above-described first embodiment, the tool direction was instructed with the tool direction vector instruction (in, jn, kn) according to the address I, J, K, and the tool phase direction was instructed with the tool phase direction vector instruction (un, vn, wn) (n=1, 2, . . . ) according to the address U, V, W. In the fourth embodiment, however, the tool posture instruction is in the form of a quaternion instruction, as in machining program example 4 illustrated in FIG. 14. Herein, rn instructed according to the address R is the real component of the quaternion instruction, and un, vn, wn (n=1, 2, . . . ) instructed according to the address U, V, W is the imaginary component of the quaternion instruction. The foregoing are read by the tool position and posture instruction reading unit (FIG. 16). A quaternion is a number that corresponds to a rotation by an angle about a rotation center axis. Accordingly, there can be instructed a quaternion, which rotates the initial tool direction vector Vt0 and the initial tool phase direction vector Vp0 to the tool direction and tool phase direction by an angle about a rotation center axis. Herein, Vt0 and Vp0 are the initial tool direction and initial tool phase direction at a time where the positions of the A-axis, B-axis and C-axis, which are rotation axes, are A=B=C=0. Other instructions are identical to those in machining program example 1.

A quaternion instruction $q_n$ instructed according to rn, un, vn, wn is represented by Expression (12) below, where $q_n$ is a unit quaternion. That is, there holds $rn^2+un^2+vn^2+wn^2=1$, where, i, j, k are imaginary units, such that $i^2=j^2=k^2=i*j*k=-1$ and $i*j=-j*i=k$, $j*k=-k*j=i$, $k*i=-i*k=j$.

$$q_n = rn + i(un) + j(vn) + k(wn) \tag{12}$$

Figure 15:
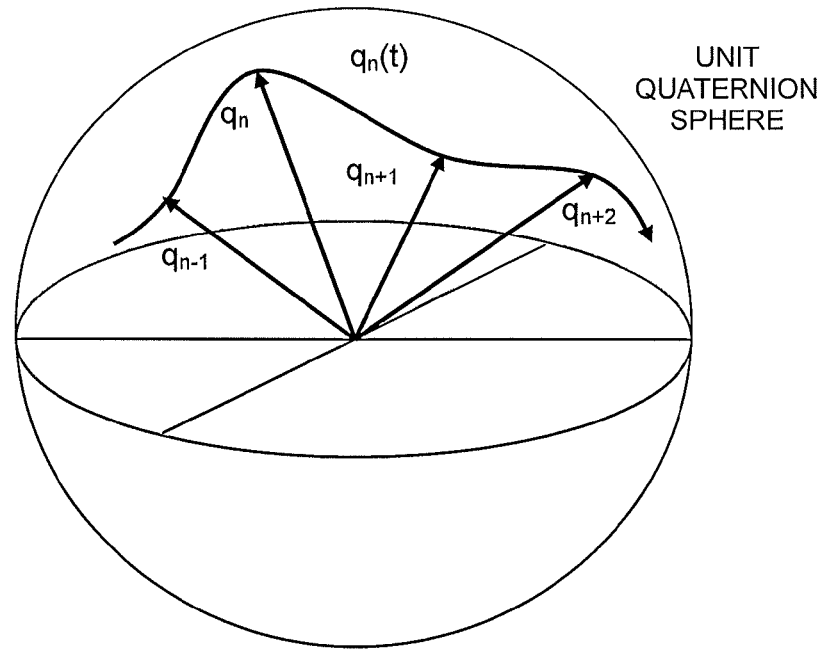
FIG. 15 is a diagram for explaining a quaternion on a unit quaternion sphere.

As in the first embodiment, the tool position is interpolated smoothly on the basis of the instruction point sequence (x1, y1, z1), (x2, y2, z2), . . . of the address X, Y, Z, to yield Pt(Ptx, Pty, Ptz). A quaternion $q_n(t)$ over the quaternion instructions $q_n$ to $q_{n+1}$ is represented by Expression (13), such that there is worked out an interpolated quaternion $q=q_n(s)$ at an interpolation time τ, where "s" is the "s" explained in the first embodiment. A spherical cubic interpolation method, referred to as "squad" is herein one method for interpolating quaternions smoothly. Techniques for interpolating quaternions smoothly are known in the art, as disclosed in, for instance, Japanese Patent Application Laid-Open No. 2007-322392, and will not be explained in detail here. The quaternion instructions $q_{n-1}$, $q_n$, $q_{n+1}$, $q_{n+2}$ and the quaternion $q_n(t)$ can be depicted, as in FIG. 15, on a unit quaternion sphere.

$$\begin{aligned} q_n(t) &= \text{squad}(t; q_n, q_{n+1}, a_n, b_{n+1}) \\ &= \text{slerp}(2t(1-t); \text{slerp}(t; q_n, q_{n+1}), \text{slerp}(t; a_n, b_{n+1})) \end{aligned} \tag{13}$$

$$(0 \le t \le 1)$$

Herein, $a_n$, $b_{n+1}$ are given by Expression (14) below.

$$a_n(=b_n) = q_n * \exp\left(-\frac{\ln(q_n^{-1} * q_{n-1}) + \ln(q_n^{-1} * q_{n+1})}{4}\right) \tag{14}$$

$$b_{n+1} = q_{n+1} * \exp\left(-\frac{\ln(q_{n+1}^{-1} * q_n) + \ln(q_{n+1}^{-1} * q_{n+2})}{4}\right)$$

Spherical linear interpolation, referred to as "slerp", is given by Expression (15) below for unit quaternions α and β. Herein, "●" denotes inner product, and θ is the angle formed by α and β. (Note that this θ is different from the deviation angle θ of the third embodiment.)

$$\text{slerp}(t; \alpha, \beta) \tag{15}$$
$$= \frac{\alpha * \sin(\theta(1-t)) + \beta * \sin(\theta t)}{\sin\theta}$$
$$\alpha \cdot \beta = \cos\theta$$
$$(0 \le t \le 1)$$

Thus, an interpolated quaternion q resulting from interpolating a quaternion smoothly on the basis of the quaternion instruction is represented by Expression (16) below where qr is the real part and qu, qv, qw are the imaginary part.

$$q = qr + i(qu) + j(qv) + k(qw) \tag{16}$$

As described above, the quaternion is a number corresponding to rotation about a rotation center axis by an angle. Therefore, the interpolated quaternion represents the interpolated tool direction and interpolated tool phase direction resulting from rotating the initial tool direction and the initial tool phase direction by that interpolated quaternion. In the present embodiment, accordingly, the interpolated quaternion is used as the interpolated tool posture that comprises the interpolated tool direction and the interpolated tool phase direction. The abovementioned interpolation is performed by the tool position and posture interpolation unit. The interpolated quaternion q corresponds to a rotation matrix M as given by Expression (17) below.

$$M = \begin{bmatrix} 1 - 2(qv^2 + qw^2) & 2(qu*qv - qr*qw) & 2(qw*qu + qr*qv) \\ 2(qu*qv + qr*qw) & 1 - 2(qw^2 + qu^2) & 2(qv*qw - qr*qu) \\ 2(qw*qu - qr*qv) & 2(qv*qw + qr*qu) & 1 - 2(qu^2 + qv^2) \end{bmatrix} \tag{17}$$

A rotation matrix R such that the positions of the A-axis, B-axis and C-axis are A, B and C, respectively, can be written as in Expression (18) below.

$$R = \begin{bmatrix} \cos C & -\sin C & 0 \\ \sin C & \cos C & 0 \\ 0 & 0 & 1 \end{bmatrix} \begin{bmatrix} \cos B & 0 & \sin B \\ 0 & 1 & 0 \\ -\sin B & 0 & \cos B \end{bmatrix} \begin{bmatrix} 1 & 0 & 0 \\ 0 & \cos A & -\sin A \\ 0 & \sin A & \cos A \end{bmatrix} \tag{18}$$

$$= \begin{bmatrix} \cos C * \cos B & \cos C * \sin B * \sin A - \sin C * \cos A & \cos C * \sin B * \cos A + \sin C * \sin A \\ \sin C * \cos B & \sin C * \sin B * \sin A + \cos C * \cos A & \sin C * \sin B * \cos A - \cos C * \sin A \\ -\sin B & \cos B * \sin A & \cos B * \cos A \end{bmatrix}$$

Herein, A, B and C worked out by solving R=M are the positions to which the A-axis, B-axis and C-axis corresponding to q are driven. Further, Pc(Pcx, Pcy, Pcz) is worked out using Expressions (3) to (7) in the first embodiment, for A, B, C, and the obtained Pc is used as the control point position to which the X-axis, Y-axis and Z-axis are driven. The positions Pc(Pcx, Pcy, Pcz), A, B, C for the respective axes are worked out in respective axis positions arithmetic unit 5 (FIG. 16).

Fifth Embodiment

In a case where, as in machining program example 1 (FIG. 9) of the first embodiment, the tool posture instruction (tool direction instruction, tool phase direction instruction) involves an instruction according to the tool direction vector instruction (in, jn, kn), as the tool direction, and an instruction according to the tool phase direction vector instruction (un, vn, wn), as the tool phase direction, the calculation can be performed in the same way as in the fourth embodiment, by working out a corresponding quaternion instruction that corresponds to the foregoing. Herein, there are worked out bn, cn, Rbn and Rcn that satisfy Expression (8) above, and an and Ran that satisfy Expression (9) above. In a case where the tool posture instruction (tool direction instruction, tool phase direction instruction) is instructed according to the rotation axis position (an, bn, cn), as in the second embodiment, it suffices to similarly work out Ran, Rbn, Rcn for these an, bn, cn. A matrix Rn for these Ran, Rbn, Rcn is represented by Expression (19) below, wherein r11 to r33 are the elements of the matrix Rn.

$$Rn = Rcn * Rbn * Ran = \begin{bmatrix} r11 & r12 & r13 \\ r21 & r22 & r23 \\ r31 & r32 & r33 \end{bmatrix} \quad (19)$$

The respective elements of the corresponding quaternion instruction $q_n$ (=rn+i(un)+j(vn)+k(wn)) that corresponds to an, bn, cn are worked out on the basis of Expression (20) below. Herein, un, vn, kn are set as the elements of the corresponding quaternion instruction, but it should be noted here that these elements un, vn, kn of the quaternion are different from the (un, vn, wn) of the tool phase direction vector instruction, although the same symbols are used here for convenience.

$$rn = \frac{\sqrt{r11 + r22 + r33 + 1}}{2} \quad (20)$$

$$un = \frac{r32 - r23}{4(rn)}$$

$$vn = \frac{r13 - r31}{4(rn)}$$

$$wn = \frac{r21 - r12}{4(rn)}$$

Once the corresponding quaternion instruction has been worked out, it suffices to perform calculations from Expression (12) onwards in the fourth embodiment. Alternatively, in a case where a rotation axis instruction (an, bn, cn) for three rotation axes is instructed, as in machining program example 2 (FIG. 11) of the second embodiment, the corresponding quaternion instruction $q_n$ can be worked out by performing calculations from Expression (19) onwards. Thereafter, it suffices to perform calculations from Expression (12) onward in the fourth embodiment. Features ensuing after that point will not be explained again.

A numerical controller according to the present invention will be explained next with reference to the block diagram of FIG. 16.

Ordinarily, the numerical controller reads the instructions of the machining program by way of the machining program reading unit 1, performs interpolation, by way of an interpolation unit 2, on the basis of the instructions, and drives the respective axis servos (6X, 6Y, 6Z, 6A, 6B, 6C). A tool position and posture instruction reading unit 3 of the present invention belongs to the machining program reading unit 1, and a tool position and posture interpolation unit 4 and respective axis positions arithmetic unit 5 belong to the interpolation unit 2.

Figure 17:
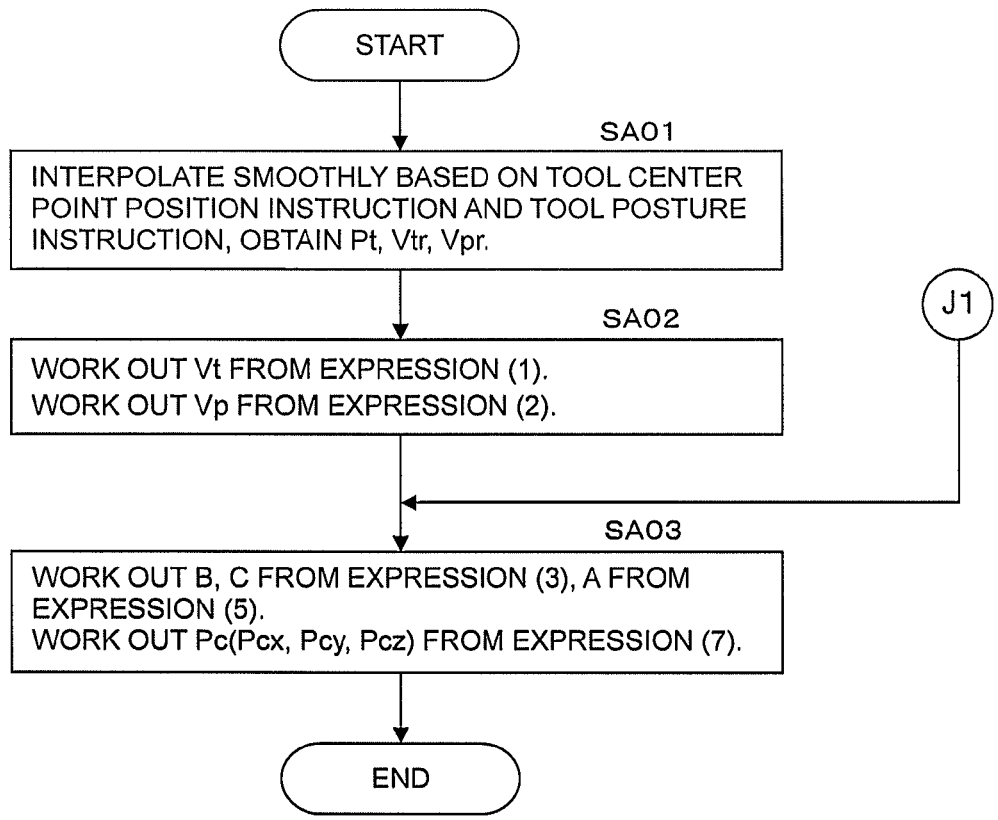
FIG. 17 is a flowchart for explaining a process in a tool position and posture interpolation unit and respective axis positions arithmetic unit in the numerical controller (first embodiment) illustrated in FIG. 16.

The processes executed by the tool position and posture interpolation unit in the first embodiment of the numerical controller of the present invention will be explained based on the flowchart of FIG. 17. The process is explained hereafter in accordance with each step.

[Step SA01] Interpolation is performed smoothly on the basis of the tool center point position instruction and the tool posture instruction, to obtain the interpolated tool center point position Pt, interpolated tool direction vector instruction Vtr and interpolated tool phase direction vector instruction Vpr.

[Step SA02] The interpolated tool direction vector Vt is worked out on the basis of Expression (1), and the interpolated tool phase direction vector Vp is worked out on the basis of Expression (2).

[Step SA03] The driving positions B and C in the B-axis and C-axis are worked out on the basis of Expression (3), the driving position in the A-axis is worked out on the basis of Expression (5), and the control point position Pc(Pcx, Pcy, Pcz) to which the X-axis, Y-axis, Z-axis are driven is worked out on the basis of Expression (7).

The process in steps SA01, SA02 is executed by the tool position and posture interpolation unit 4, and the process in step SA03 is executed by the respective axis positions arithmetic unit 5.

Figure 18:
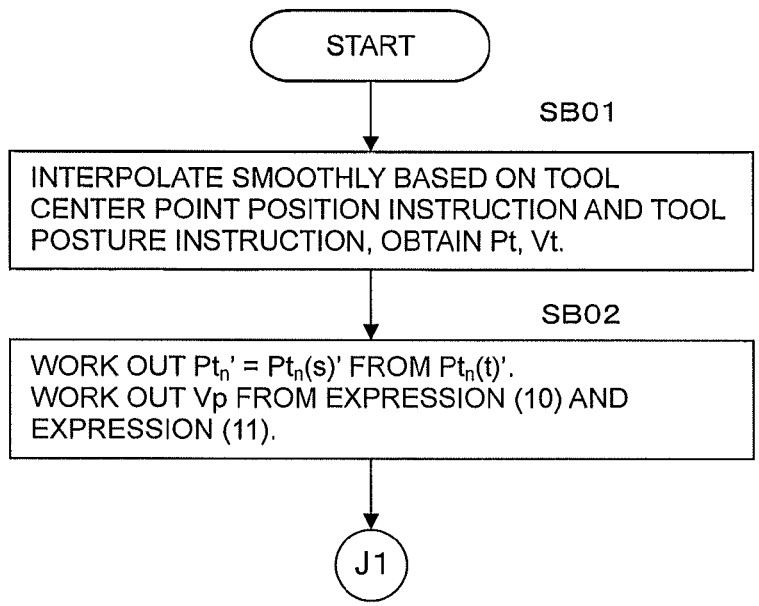
FIG. 18 is a flowchart for explaining a process in a tool position and posture interpolation unit in the numerical controller (third embodiment) illustrated in FIG. 16.

The processes executed by the tool position and posture interpolation unit and the respective axis positions arithmetic unit in the third embodiment of the numerical controller of the present invention will be explained based on the flowchart of FIG. 18. The process is explained hereafter in accordance with each step.

[Step SB01] Interpolation is performed smoothly on the basis of the tool center point position instruction and the tool posture instruction, and the interpolated tool center point position Pt and interpolated tool direction vector Vt are worked out.

[Step SB02] Then, Pt'=Pt$_n$(s)' is worked out from Pt$_n$(t)', which is the derivative of the function Pt$_n$(t) that represents a smooth curve that passes through the instruction point sequence from an n-th block to an (n+1)th block. The interpolated tool phase direction vector Vp is worked out on the basis of Expression (10) and Expression (11), and the process proceeds to step SA03 (FIG. 17).

The process in steps SB01 and SB02 is executed by the tool position and posture interpolation unit 4.

The processes executed by the tool position and posture interpolation unit and the respective axis positions arithmetic unit in the fourth embodiment of the numerical controller of the present invention will be explained based on the flowchart of FIG. 19. The process is explained hereafter in accordance with each step.

[Step SC01] The quaternion instruction $q_n$ is worked out on the basis of Expression (12).

[Step SC02] The interpolated tool center point position Pt is obtained by performing interpolation smoothly on the basis of the tool center point position instruction.

[Step SC03] Then, $q_n(t)$, which is the expression that represents the quaternion instruction $q_n$ to $q_{n+1}$, is worked out from Expressions (13) to (15). The interpolated quaternion q at an interpolation time τ is worked out in accordance with $q=q_n(s)$.

[Step SC04] The driving positions A, B, C of the A-axis, B-axis and C-axis are worked out from R=M in Expression (17) and Expression (18). The control point position Pc(Pcx, Pcy, Pcz) to which the X-axis, Y-axis, Z-axis are driven is worked out on the basis of Expression (3), Expression (5) and Expression (7).

The process in steps SC01, SC02, SC03 is executed by the tool position and posture interpolation unit 4, and the process in step SC04 is executed by the respective axis positions arithmetic unit 5.

Figure 20:
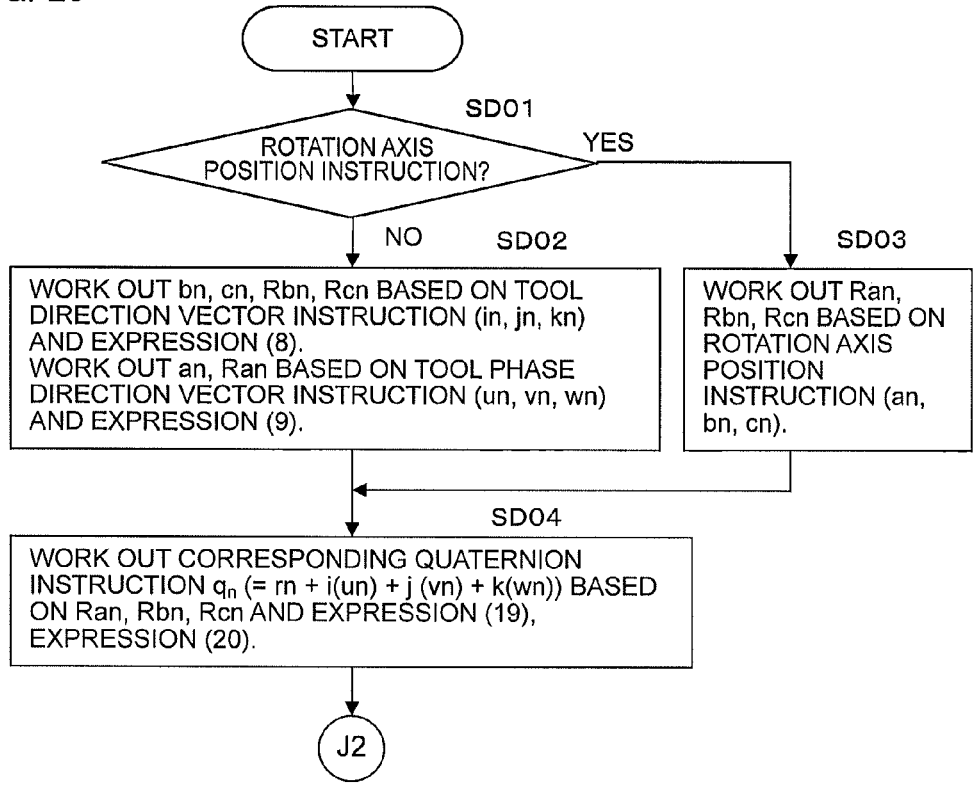
FIG. 20 is a flowchart for explaining a process in a tool position and posture interpolation unit in the numerical controller (fifth embodiment) illustrated in FIG. 16.
Figure 21:
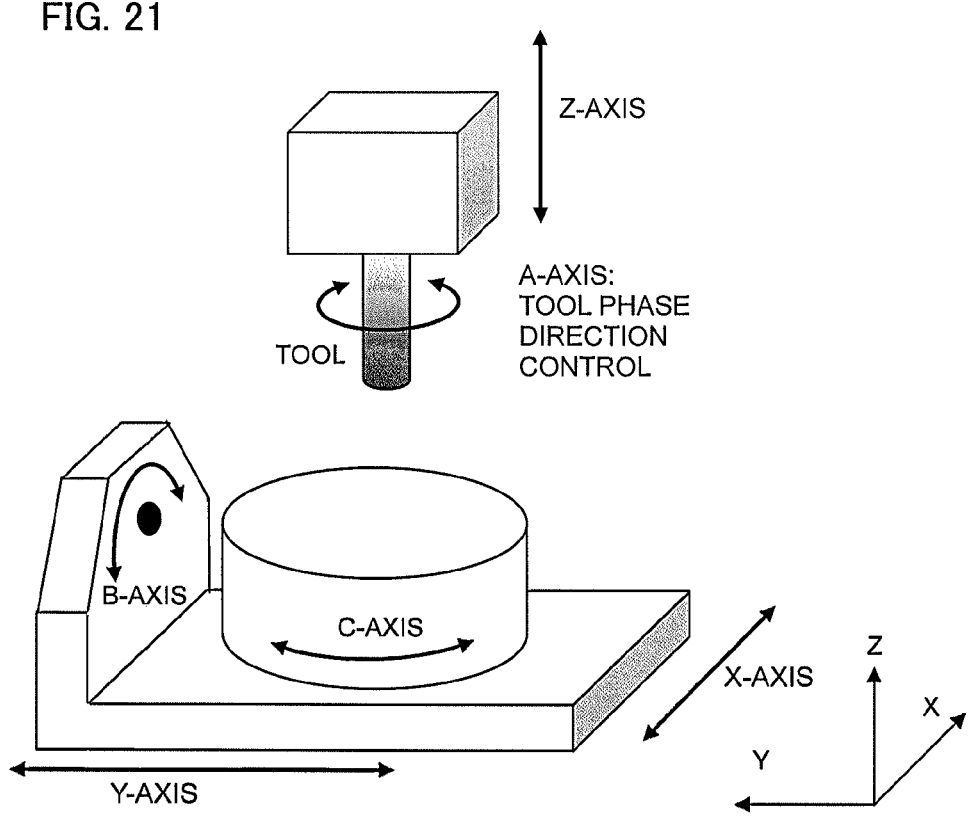
FIG. 21 is a diagram for explaining a table rotation-type multi-axis machining machine.
Figure 22:
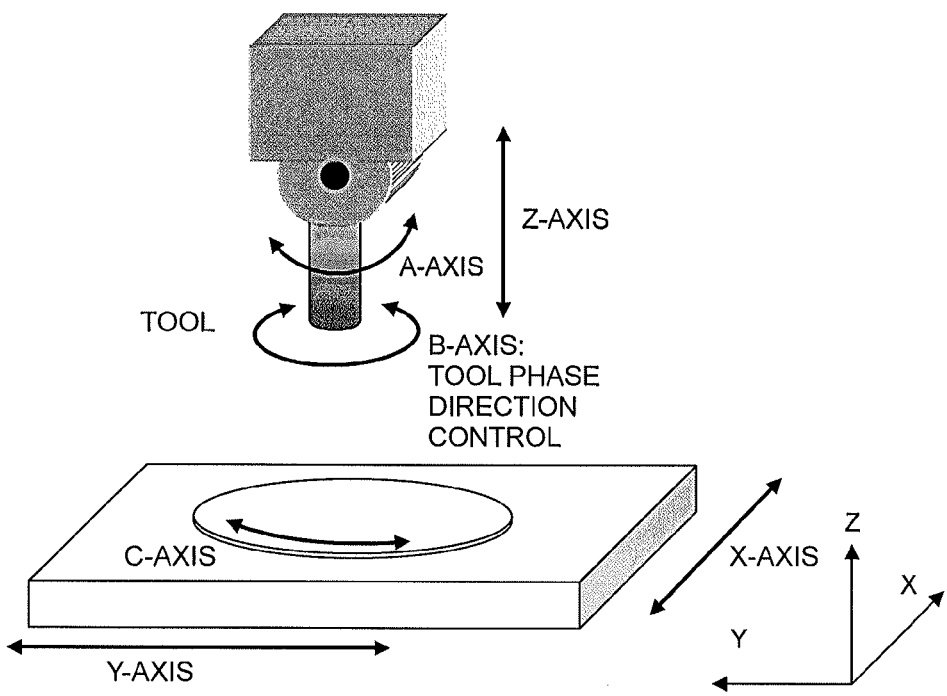
FIG. 22 is a diagram for explaining a mixed-type multi-axis machining machine.

The processes executed by the tool position and posture interpolation unit in the fifth embodiment of the numerical controller of the present invention will be explained based on the flowchart of FIG. 20. The process is explained hereafter in accordance with each step.

[Step SD01] It is determined whether the tool posture instruction is a rotation axis position instruction or not; if the tool posture instruction is not a rotation axis position instruction (NO), the process proceeds to step SD02; if the tool posture instruction is a rotation axis position instruction (YES), the process proceeds to step SD03.

[Step SD02] The rotation axis instructions bn, cn for the B-axis and C-axis, as well as Rbn, Rcn corresponding to bn, cn, are worked out on the basis of the tool direction vector instruction (in, jn, kn) and Expression (8). The rotation axis instruction an for the A-axis, and Ran corresponding to an, are worked out on the basis of the tool phase direction vector instruction (un, vn, wn) and Expression (9).

[Step SD03] Then, Ran, Rbn and Rcn are worked out on the basis of the rotation axis position instruction (an, bn, cn).

Figure 19:
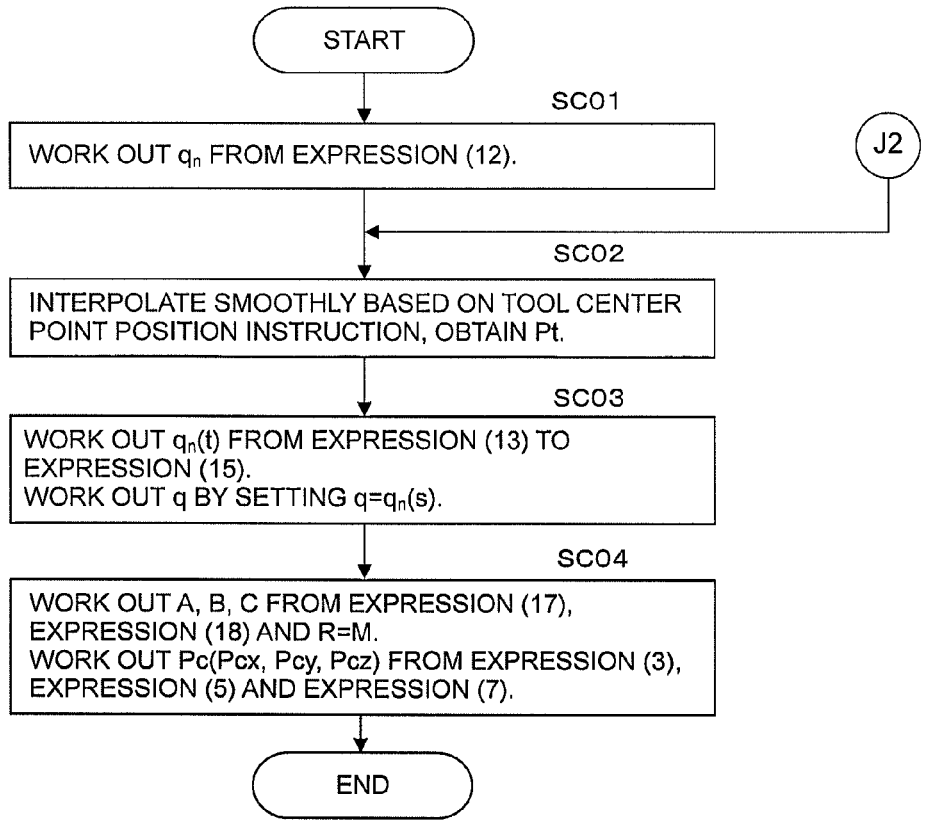
FIG. 19 is a flowchart for explaining a process in a tool position and posture interpolation unit and respective axis positions arithmetic unit in the numerical controller (fourth embodiment) illustrated in FIG. 16.

[Step SD04] The corresponding quaternion instruction $q_n$ (=rn+i(un)+j(vn)+k(wn)) that corresponds to the rotation axis position instruction an, bn, cn is worked out on the basis of Ran, Rbn, Rcn that are obtained in step SD02 or step SD03, and on the basis of Expression (19) and Expression (20), and the process proceeds to step SC02 (FIG. 19).

The process in steps SD01, SD02, SD03 and SD04 is executed by the tool position and posture interpolation unit 4.

Thus, the present invention provides a numerical controller having a tool posture control function for multi-axis machining machines that enables machining while varying smoothly a tool with a smooth tool center point pathway, a smooth tool direction pathway (pathway of the tip of a tool direction vector) and a smooth tool phase direction pathway (pathway of the tip of a tool phase direction vector), in machining that involves varying the tool center point position, the tool direction (tool direction vector) and the tool phase direction (tool phase direction vector). A smoother machined surface can be obtained by controlling the multi-axis machining machine using this numerical controller. That is, fibers can be wound more smoothly, in a case where the multi-axis machining machine is a fiber placement machine, smoother cut surfaces can be obtained in the case of a water jet machine, while smoother machined surfaces can be obtained in hale machining.

What is claimed is:

1. A numerical controller having a tool posture control function for multi-axis machining machine, which controls a multi-axis machining machine having at least three linear axes and at least three rotation axes including one rotation axis for tool phase control, the numerical controller comprising:

a tool position and posture instruction reading unit that reads a tool center point position instruction, a tool direction vector instruction, and a tool phase direction vector instruction;

a tool position and posture interpolation unit that
interpolates the tool center point position instruction to obtain an interpolated tool center point position Pt,
interpolates the tool direction vector instruction to obtain Vtr,
interpolates the tool phase direction vector instruction to obtain Vpr,
normalizes the Vtr to obtain an interpolated tool direction vector Vt, and
obtains, from the Vpr and the interpolated tool direction vector Vt, a normalized and interpolated tool phase direction vector Vp lying on the plane formed by the interpolated tool direction vector Vt and the Vpr and being perpendicular to the interpolated tool direction vector Vt, by using the following Expression, $$Vp = \frac{(Vt \times Vpr) \times Vt}{|(Vt \times Vpr) \times Vt|}$$

and uses the interpolated tool direction vector Vt and the interpolated tool phase direction vector Vp as an interpolated tool posture, wherein, in the multi-axis machining machine that is configured to control a tool head with three linear axes, control a tool direction with two rotation axes and control a tool phase direction with tool phase axis, the tool position and posture interpolation unit further:
obtains the positions of the two rotation axes from the interpolated tool direction vector Vt by solving an expression realizing Vt with the positions of the two rotation axes;
obtains the position of the tool phase axis from the interpolated tool phase direction vector Vp by solving an expression realizing Vp with the position of the tool phase axis; and
obtains, from the interpolated center point position Pt, the interpolated tool direction vector Vt and a tool length compensation amount Th, the control point position Pc to which the three linear axes are driven by using the following Expression, $Pc=Pt+Th*Vt$; and a respective axis positions arithmetic unit that calculates respective axis positions of the at least three linear axes and the at least three rotation axes, on the basis of the interpolated tool center point position Pt and the interpolated tool posture, wherein the at least three linear axes and the at least three rotation axes are driven to the respective axis positions, wherein the tool phase direction is direction which is perpendicular to the tool direction and decides direction of operation of a working part of the tool head, wherein the working part of the tool head is part of tool head that comes into contact with a workpiece to perform multi-axis machining, and wherein a tool phase axis is axis created by the tool phase direction.

2. The numerical controller having a tool posture control function for multi-axis machining machine according to claim 1, wherein the tool position and posture instruction reading unit obtains the tool direction vector instruction from a rotation axis position instruction for the two rotation axes in which the tool direction is controlled, using the following equation, $$\begin{bmatrix} in \\ jn \\ kn \end{bmatrix} = Rcn^* Rbn^* Vt0$$

$$Rcn = \begin{bmatrix} \cos(cn) & -\sin(cn) & 0 \\ \sin(cn) & \cos(cn) & 0 \\ 0 & 0 & 1 \end{bmatrix}$$

$$Rbn = \begin{bmatrix} \cos(bn) & 0 & \sin(bn) \\ 0 & 1 & 0 \\ -\sin(bn) & 0 & \cos(bn) \end{bmatrix}$$

wherein (in, jn, kn) is the tool direction vector instruction, (bn, cn) is the rotation axis position instruction for the two rotation axes in which the tool direction is controlled, and Vt0 is a unit vector that denotes an initial tool direction at a time when the position of each rotation axis is zero, and the tool position and posture instruction reading unit also obtains the tool phase direction vector instruction from (bn, cn) and a rotation axis position instruction for one rotation axis in which the tool phase direction is controlled, using the following equation, $$\begin{bmatrix} un \\ vn \\ wn \end{bmatrix} = Rcn^* Rbn^* Ran^* Vp0$$

$$Ran = \begin{bmatrix} 1 & 0 & 0 \\ 0 & \cos(an) & -\sin(an) \\ 0 & \sin(an) & \cos(an) \end{bmatrix}$$

wherein (un, vn, wn) is the tool phase direction vector instruction, (an) is the rotation axis position instruction for one rotation axis in which the tool phase direction is controlled, and Vp0 is a unit vector that denotes the initial tool phase direction at a time when the position of each of those rotation axes is zero.

3. A numerical controller having a tool posture control function for multi-axis machining machine, which controls a multi-axis machining machine having at least three linear axes and at least three rotation axes including one rotation axis for tool phase control, the numerical controller comprising:

a tool position and posture instruction reading unit that reads a tool center point position instruction, a tool direction vector instruction, and a tool phase deviation angle instruction θ being a deviation angle of a tool phase direction from the tool center point travel direction;

a tool position and posture interpolation unit that interpolates the tool center point position instruction to obtain an interpolated tool center point position Pt, obtains the derivative Pt' of the interpolated tool center point position Pt, interpolates the tool direction vector instruction to obtain Vtr, normalizes the Vtr to obtain an interpolated tool direction vector Vt, and obtains an interpolated tool phase direction vector Vp that is perpendicular to the interpolated tool direction vector Vt and that forms the tool phase deviation angle instruction θ with respect to the plane formed by the interpolated tool direction vector Vt and the derivative Pt' of the interpolated tool center point position Pt; and a respective axis positions arithmetic unit that calculates respective axis positions of the at least three linear axes and the at least three rotation axes, on the basis of the interpolated tool center point position and the interpolated tool posture, wherein in the multi-axis machining machine that is configured to control a tool head with three linear axes, control a tool direction with two rotation axes, and control the tool phase direction with tool phase axis, the tool position and posture interpolation unit further:

obtains the positions of the two rotation axes from the interpolated tool direction vector Vt by solving an expression realizing Vt with the positions of the two rotation axes;

obtains the position of the tool phase axis from the interpolated tool phase direction vector Vp by solving an expression realizing Vp with the position of the tool phase axis; and obtains, from the interpolated center point position Pt, the interpolated tool direction vector Vt and a tool length compensation amount Th, the control point position Pc to which the three linear axes are driven by using the following Expression, $Pc=Pt+Th^*Vt$; and the at least three linear axes and the at least three rotation axes are driven to the respective axis positions.

4. A numerical controller having a tool posture control function for multi-axis machining machine, which controls a multi-axis machining machine having at least three linear axes and at least three rotation axes including one rotation axis for tool phase control, the numerical controller comprising:

a tool position and posture instruction reading unit that reads a machine program that includes a tool center point position instruction and a tool posture instruction which is a quaternion instruction by a quaternion that instructs the tool direction and the tool phase direction rotated from an initial tool direction and an initial tool phase direction;

a tool position and posture interpolation unit that interpolates a tool center point position and a tool posture on the basis of the tool center point position instruction and the tool posture instruction, and obtains an interpolated tool center point position Pt and an interpolated tool posture formed on the basis of an interpolated tool direction Vt and an interpolated tool phase direction 1p; and a respective axis positions arithmetic unit that calculates respective axis positions of the at least three linear axes and the at least three rotation axes, on the basis of the interpolated tool center point position and the interpolated tool posture, wherein in the multi-axis machining machine that is configured to control a tool head with three linear axes, control a tool direction with two rotation axes, and control a tool phase direction with tool phase axis, the tool position and posture interpolation unit further:
  obtains the positions of the two rotation axes from the interpolated tool direction Vt by solving an expression realizing Vt with the positions of the two rotation axes;
  obtains the position of the tool phase axis from the interpolated tool phase direction Vp by solving an expression realizing Vp with the position of the tool phase axis; and
  obtains, from the interpolated center point position Pt, the interpolated tool direction Vt and a tool length compensation amount Th, the control point position Pc to which the three linear axes are driven by using the following Expression, $$Pc = Pt + Th*Vt;\text{ and}$$

the at least three linear axes and the at least three rotation axes are driven to the respective axis positions.

5. The numerical controller having a tool posture control function for multi-axis machining machine according to claim 4, wherein the tool position and posture interpolation unit is configured so as to interpolate the tool center point position to obtain the interpolated tool center point position, and also to interpolate a quaternion on the basis of the quaternion instruction to obtain an interpolated quaternion, and use the interpolated quaternion as the interpolated tool posture.

6. A numerical controller having a tool posture control function for multi-axis machining machine, which controls a multi-axis machining machine having at least three linear axes and at least three rotation axes including one rotation axis for tool phase control, the numerical controller comprising:
  a tool position and posture instruction reading unit that reads a machine program that includes a tool center point position instruction and a tool posture instruction for a tool posture formed on the basis of a tool direction and a tool phase direction;
  a tool position and posture interpolation unit that interpolates a tool center point position on the basis of the tool center point position instruction to obtain an interpolated tool center point position Pt, and obtains a corresponding quaternion instruction from the tool posture instruction and, on the basis of the corresponding quaternion instruction, interpolate a quaternion, obtains an interpolated quaternion, and use the interpolated quaternion as an interpolated tool posture on the basis of an interpolated tool direction vector Vt and an interpolated tool phase direction vector Vp; and
  a respective axis positions arithmetic unit that calculates respective axis positions of the at least three linear axes and the at least three rotation axes, on the basis of the interpolated tool center point position Pt and the interpolated tool posture, wherein
  in the multi-axis machining machine that is configured to control a tool head with three linear axes, control a tool direction with two rotation axes and control a tool phase direction with tool phase axis, the tool position and posture interpolation unit further:
    obtains the positions of the two rotation axes from the interpolated tool direction vector Vt by solving an expression realizing Vt with the positions of the two rotation axes;
    obtains the position of the tool phase axis from the interpolated tool phase direction vector Vp by solving an expression realizing Vp with the position of the tool phase axis; and
    obtains, from the interpolated center point position Pt, the interpolated tool direction vector Vt and a tool length compensation amount Th, the control point position Pc to which the three linear axes are driven by using the following Expression, $$Pc = Pt + Th*Vt;\text{ and}$$

the at least three linear axes and the at least three rotation axes are driven to the respective axis positions.

* * * * *